(12) United States Patent
Arai

(10) Patent No.: US 9,398,182 B2
(45) Date of Patent: Jul. 19, 2016

(54) INFORMATION PROCESSING APPARATUS FOR OBTAINING A READING IMAGE OF A READING TARGET, METHOD FOR CONTROLLING THE SAME, AND STORAGE MEDIUM

(71) Applicant: CANON KABUSHIKI KAISHA, Tokyo (JP)

(72) Inventor: Tsunekazu Arai, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/507,697

(22) Filed: Oct. 6, 2014

(65) Prior Publication Data

US 2015/0098115 A1 Apr. 9, 2015

(30) Foreign Application Priority Data

Oct. 7, 2013 (JP) ................................. 2013-210430

(51) Int. Cl.
*H04N 1/00* (2006.01)
*H04N 1/195* (2006.01)

(52) U.S. Cl.
CPC ....... *H04N 1/00809* (2013.01); *H04N 1/00782* (2013.01); *H04N 1/00811* (2013.01); *H04N 1/00816* (2013.01); *H04N 1/19594* (2013.01); *H04N 2201/0436* (2013.01)

(58) Field of Classification Search
CPC .......... H04N 1/00803; H04N 1/00811; H04N 1/00456; H04N 1/00684; H04N 1/00687; H04N 1/00702; H04N 1/00782; H04N 1/00689

USPC ....................... 358/1.18, 1.12, 3.24, 505, 488
See application file for complete search history.

(56) References Cited

U.S. PATENT DOCUMENTS

| 5,068,913 | A | * | 11/1991 | Sugiura ......................... 382/175 |
| 6,697,536 | B1 | | 2/2004 | Yamada |
| 6,862,119 | B1 | * | 3/2005 | Yamamoto ......... H04N 1/00912 358/474 |
| 2003/0058364 | A1 | | 3/2003 | Kuo |
| 2003/0165276 | A1 | | 9/2003 | Seeger |
| 2007/0188830 | A1 | | 8/2007 | Watanuki |
| 2011/0188093 | A1 | | 8/2011 | Campbell |
| 2012/0262763 | A1 | * | 10/2012 | Tang et al. .................... 358/448 |

FOREIGN PATENT DOCUMENTS

| JP | 9-307712 A | 11/1997 |
| JP | 2000-004390 A | 1/2000 |
| JP | 4396742 B2 | 1/2010 |

* cited by examiner

*Primary Examiner* — Jamares Q Washington
(74) *Attorney, Agent, or Firm* — Canon USA Inc., IP Division

(57) ABSTRACT

There is provided an information processing apparatus that can improve operability for reading a reading target including a plurality of objects. In the information processing apparatus, when the reading target placed on a reading plate on which a plurality of objects can be placed is read, a completion level of the reading target including one or more objects placed on the reading plate is determined based on an image obtained by an imaging unit that captures an image of the reading plate from above. A timing of executing the reading of the reading target is controlled based on the completion level of the reading target determined by a determination unit.

19 Claims, 11 Drawing Sheets

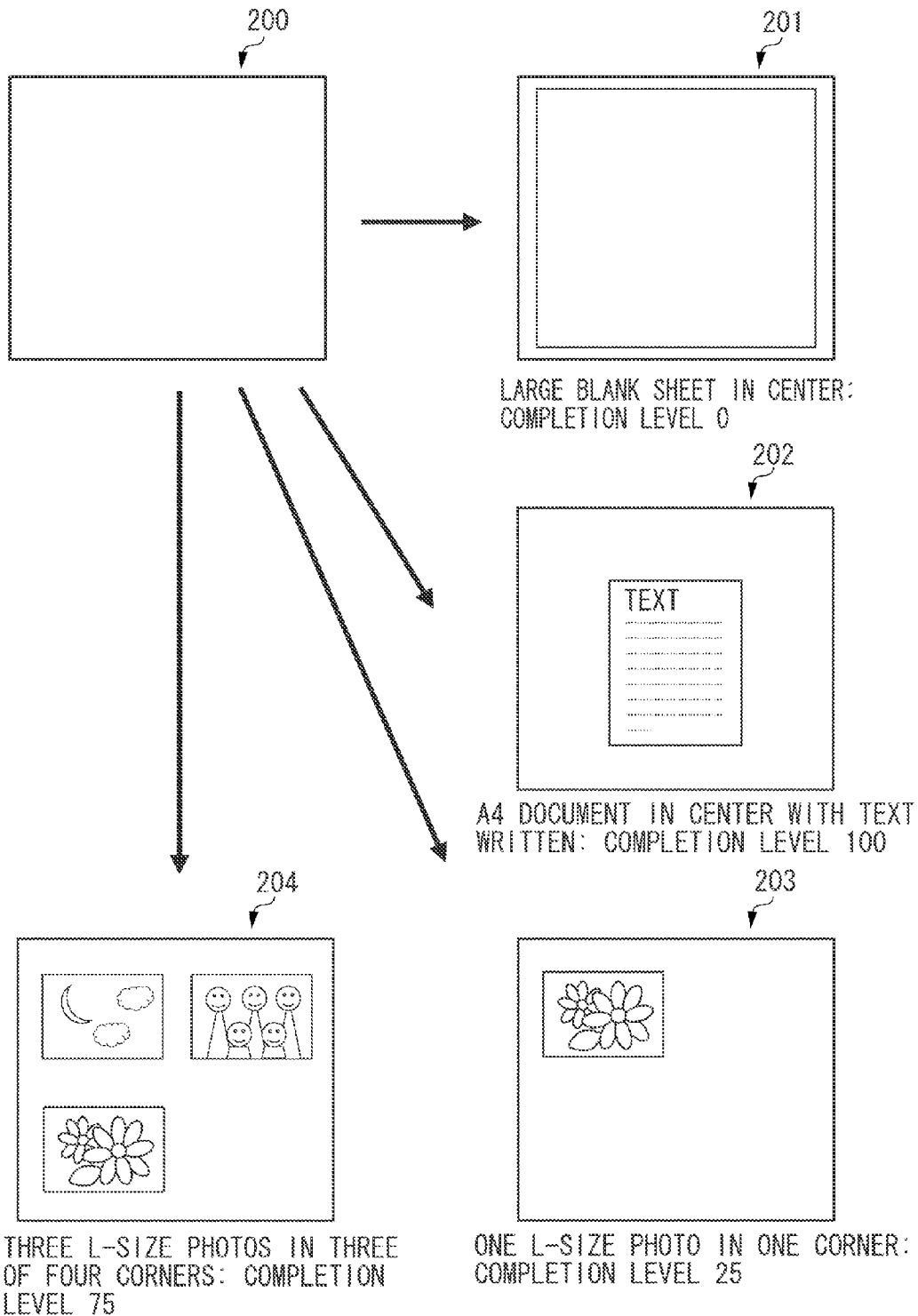

| STATE CHANGE | OPERATION INTERVAL | DETERMINED REFERNCE WAITING TIME | COMPLETION LEVEL | SET WAITING TIME |
|---|---|---|---|---|
| INITIAL STATE TO 1000 |  | 6 SECONDS | 0 | 10 SECONDS |
| 1000~1001 | 1 SECOND | 1.5 SECOND | 25 | 2 SECONDS |
| 1001~1002 | 2 SECONDS | 3.75 SECONDS | 50 | 4 SECONDS |
| 1002~1003 | 1 SECOND | 3.5 SECONDS | 100 | 3 SECONDS |

1101

| STATE CHANGE | OPERATION INTERVAL | DETERMINED REFERNCE WAITING TIME | COMPLETION LEVEL | SET WAITING TIME |
|---|---|---|---|---|
| INITIAL STATE TO 1000 |  | 6 SECONDS | 0 | 10 SECONDS |
| 1000~1001 | 10 SECONDS | 15 SECONDS | 25 | 15 SECONDS |
| 1001~1002 | 11 SECONDS | 17.25 SECONDS | 50 | 17 SECONDS |
| 1002~1003 | 11 SECONDS | 17.5 SECONDS | 100 | 14 SECONDS |

INFORMATION PROCESSING APPARATUS FOR OBTAINING A READING IMAGE OF A READING TARGET, METHOD FOR CONTROLLING THE SAME, AND STORAGE MEDIUM

BACKGROUND OF THE INVENTION

1. Field of the Invention

The present invention relates to a technique for reading an original placed on a reading plate.

2. Description of the Related Art

In recent years, a reading apparatus has been developed that reads an original placed on a document positioning plate (reading plate) while facing upward, with an imaging unit mounted above the document positioning plate. With some techniques available in the processing described above, an appropriate timing for image capturing is automatically determined according to the state of the document positioning plate. Thus, a user no longer needs to set the specific reading timing.

Japanese Patent Application Laid-Open No. 9-307712 discusses a technique of using a distance measurement unit, such as a range sensor, to determine that a page of an original is flipped based on the change in the distance to the original, and executing the reading every time the page is flipped.

A document camera discussed in Japanese Patent Application Laid-Open No. 2000-4390 includes a motion detection unit for detecting a video signal on the document positioning plate. A still image, captured when a motionless state on the document positioning plate continues for a predetermined period of time, is output to a video projector. Thus, a document used for presentation is displayed as a real time image, and visually undesirable operations such as changing of the document is not displayed.

In the reading apparatus, in which the original is placed on the document positioning plate while facing upward, a single original, as a reading target, can be easily formed by disposing a plurality of originals one on top of the other or side by side as desired. However, when the originals are moved in such a manner, the same operation with the same change in distance, such as "page flipping", is not necessarily repeated. Thus, the determination to execute the reading, every time the same operation is repeated, as in Japanese Patent Application Laid-Open No. 9-307712, cannot be performed in such a case. When the image is captured (reading is executed) at a timing where the space on the document positioning plate stay motionless as in Japanese Patent Application Laid-Open No. 2000-4390, every time the motion on the document positioning plate stops, in a process of disposing a plurality of originals one on top of the other or side by side as desired, the still image representing each motionless state is captured. When a large amount of resultant images of the incomplete states are stored, the user, who only wants the reading to be executed for the completed original, needs to go through a cumbersome procedure of selecting and deleting images.

SUMMARY OF THE INVENTION

According to an aspect of the present invention, an information processing apparatus configured to execute reading of a reading target placed on a reading plate on which a plurality of object can be placed, includes a detection unit configured to detect one or more objects placed on the reading plate, a setting unit configured to set a waiting time according to at least a layout of the one or more objects detected by the detection unit, on the reading plate, and a reading control unit configured to instruct an imaging unit to perform image capturing to generate reading data in which the one or more objects are the reading target, when the layout of the one or more objects detected by the detection unit is maintained for the waiting time set by the setting unit.

Further features of the present invention will become apparent from the following description of exemplary embodiments with reference to the attached drawings.

BRIEF DESCRIPTION OF THE DRAWINGS

FIG. 2 is a diagram illustrating an example of completion levels of a reading target on a reading plate.

FIG. 11 is example tables illustrating associations among an operation interval of each user, determined reference waiting times, and set waiting times.

DESCRIPTION OF THE EMBODIMENTS

Various exemplary embodiments, features, and aspects of the invention will be described in detail below with reference to the drawings. It is to be noted that components are only exemplary described in the embodiments, and thus there is no intention to limit the scope of the present invention to the components.

In a first exemplary embodiment, it is assumed that one or more objects are sequentially arranged on a reading plate to form a single reading target. A timing of capturing a read image is determined by evaluating a completion level of the reading target, every time an object is added and then a motionless state is achieved on the reading plate. The object is a reading target (also referred to as a reading original) such as a document, vellum paper, a photograph, a post-it, and a three-dimensional object.

Figure 1A:
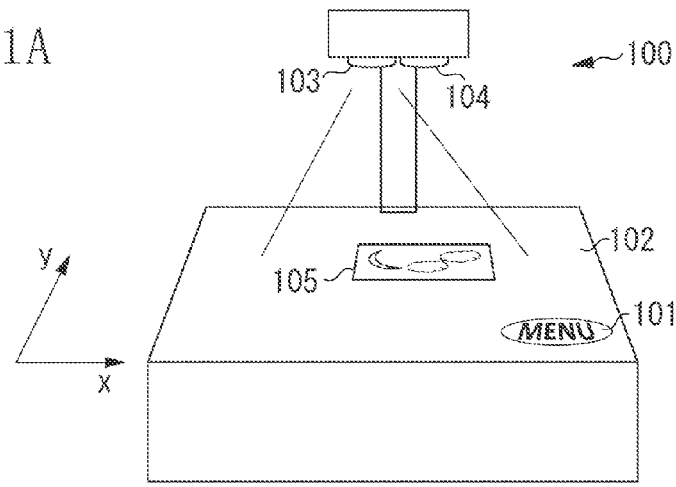
FIG. 1A is a diagram illustrating an example of an outer appearance and a usage environment of an information processing apparatus.

FIG. 1A is a diagram illustrating an example of an outer appearance of an information processing apparatus 100 according to the present exemplary embodiment. In the present exemplary embodiment, a display device 103 mounted above a reading plate 102 projects a projection image. The projection image includes a displayed item 101 (e.g., a button and an icon) for a user interface touched by a user to input an operation. With a camera 104 also disposed above the reading plate 102, an user operation can be recognized based on a captured overhead view image, and an image of a reading target 105 placed on the reading plate 102 can be captured to obtain read image data. A plurality of objects can be placed on the reading plate, and a single reading target including the objects can be read as a single piece of the read image data. In the present exemplary embodiment, the read image is an image obtained by capturing only an original as the reading target with a high resolution, and thus does not include the reading plate as a background, a user's hand, or the like. The read image data is generated as an image file, a document file, or the like, and can be transmitted to another information processing apparatus or output from a printing apparatus. In the description below, an operation of obtaining the read image data of the reading target by the camera 104 is referred to as "reading". Thus, "reading" is distinguished from an operation of obtaining an input image by the camera 104 for detecting the user's hand and the motion of the object on the reading plate 102, or determining a completion level of the reading target, which will simply be referred to as "image capturing". In the present exemplary embodiment, a gesture operation of the user can be recognized based on an image captured by the camera 104.

Figure 1B:
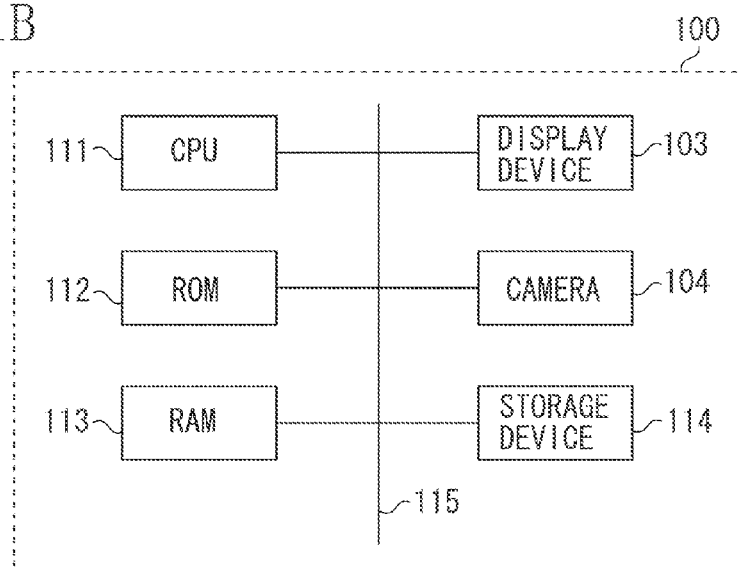
FIG. 1B is a diagram illustrating a hardware configuration of the information processing apparatus.

FIG. 1B is a hardware configuration diagram of the information processing apparatus 100 according to the present exemplary embodiment. In FIG. 1B, a central processing unit (CPU) 111 executes a control program for the information processing apparatus 100 to execute calculations and logical decisions for various types of processing, to thereby control various components connected to a system bus 115. A random access memory (ROM) 112 is a program memory and stores a program used for the control performed by the CPU 111 including various processing procedures illustrated in flowcharts described below. A random access memory (RAM) 113 is used to provide areas for the CPU 111 such as a work area, a save area for data for error processing, and a load area for the control program. A storage device 114 is a hard disk, a connected external storage device, or the like for storing data and programs related to the present exemplary embodiment. The display device 103 is a display, a projector, or the like for displaying electronic data such as the displayed item 101 and an image. In the present exemplary embodiment, a liquid crystal display is used as the display device 103. The camera 104 is an imaging unit mounted to capture an image of the reading plate 102 from above, and captures the input image. In the present exemplary embodiment, the camera 104 is a visible-light camera that captures an image of a visible-light region. The information processing apparatus 100 performs matching of a shape of a skin-color area extracted from the input image captured by the camera 104. The user's hand thus extracted can be distinguished from an object as the reading target. The information processing apparatus 100 according to the present exemplary embodiment incorporates the display device 103 and the camera 104. Alternatively, the information processing apparatus 100 may be configured to control the display device 103 and the camera 104 externally connected thereto. A component for detecting a motion of an object on the reading plate may be provided separately from the camera 104 (visible-light camera) for capturing the read image. For example, an infrared light emission device and an infrared camera for capturing an image of the reflected light are provided. In this case, an infrared image obtained by capturing an image of the reflected light is acquired. Based on a background difference method or an inter-frame difference method, an image, only including a moving object existing between the reading plate 102 and the camera 104, can be extracted from the infrared image, and can be traced. Furthermore, an infrared luminance value may be converted into distance information to determine a distance between the moving object and the reading plate 102. Thus, whether the extracted moving object is in contact with the reading plate 102 can be determined. With this configuration, a gesture operation and a touch operation performed by a user on the information processing apparatus 100 can be recognized. The configuration of acquiring the infrared image is less likely to be affected by a color of projected light from the display device 103, compared with the method of extracting the skin-color area from the image captured by the visible-light camera.

Figure 1C:
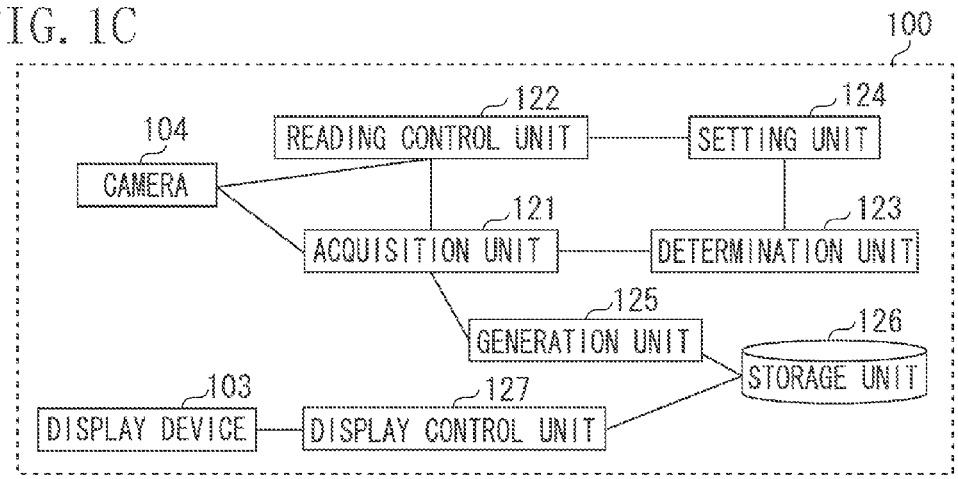
FIG. 1C is a block diagram illustrating a functional configuration of the information processing apparatus.

FIG. 1C is a functional block diagram of the information processing apparatus 100 according to the first exemplary embodiment. Each functional unit is implemented by the CPU 111 loading the program stored in the ROM 112 on the RAM 113 and executing the processing according to each flowchart described below. When the hardware is used instead of the software processing using the CPU 111, a calculation unit and a circuit corresponding to processing executed by each functional unit described herein may be used.

An acquisition unit 121 acquires an image captured by the camera 104 at every predetermined period. The acquisition unit 121 also acquires an image captured for "reading" in response to an instruction from a reading control unit 122. The data of the read image is generated based on the image for "reading" (hereinafter, referred to as a reading image). This operation will be referred to as "execute reading". In the present exemplary embodiment, the reading control unit 122 notifies the acquisition unit 121 that the image to be captured next is the reading image, when instructing the camera 104 to capture the reading image. Thus, the acquisition unit 121 can distinguish the reading image from the regular input image.

The reading control unit 122 controls the timing to execute the reading based on the completion level determined by a determination unit 123 described below. In the present exemplary embodiment, the reading control unit 122 determines whether all the things on the reading plate 102 is in a motionless state based on the input image acquired by the acquisition unit 121, compares a duration time of the motionless state with a waiting time set by a setting unit 124, and controls a timing of causing the camera 104 to capture the reading image. The things on the reading plate 102 include an object placed on the reading plate 102, a user's hand reached out to a space above the reading plate 102, and the like. When controlling the timing, the reading control unit 122 determines the size and the position of the reading target based on the input image to adjust in-focus and zoom positions and obtain the read image by capturing the image of the reading target with a high resolution, and notifies the setting information for the image capturing. Alternatively, an image only including the reading target may be obtained by trimming an image captured with the setting that is the same as that for the input image. When the user specifically instructs the execution of the reading through an operation of touching the displayed item 101, the reading control unit 122 according to the present exemplary embodiment executes the reading at the timing at which the instruction is received even during the waiting time.

The determination unit 123 evaluates the layout of the object on the reading plate 102 based on the input image acquired by the acquisition unit 121, determines the completion level of the reading target, and notifies the setting unit 124 of the completion level. More specifically, in the first exemplary embodiment, the determination unit 123 evaluates the layout based on a vacancy rate and the position of the object on an upper surface of the reading plate 102, and determines the completion level of the reading target. In the present exemplary embodiment, the completion level is a value indicating how much a state, where at least one object is placed on the reading plate 102, is completed as a single reading target. When the reading target has been completed, the user would want the reading to be immediately executed to obtain the read image data. On the other hand, when the reading target has not been completed yet, an operation time for editing and completing the reading target needs to be secured before the reading is executed. In view of such situation, the timing of executing the reading is controlled using "completion level" as an index according to the present exemplary embodiment. The setting unit 124 sets a waiting time according to the completion level determined by the determination unit 123 and notifies the reading control unit 122 of the waiting time. In the present exemplary embodiment, the waiting time is a time required for waiting before the read image is captured in the state where the object on the reading plate 102 is in the motionless state. More specifically, in the present exemplary embodiment, the read image is captured without receiving the specific instruction from the user, when the layout of the object on the reading plate 102 remains to be the same for the waiting time. For example, when the waiting time is 3 seconds, the reading image is captured when an object on the reading plate 102 stays motionless for 3 seconds. The setting unit 124 sets the waiting time to be longer, under an assumption that the user is still in the process of editing the reading target, when the completion level determined by the determination unit 123 is low. The setting unit 124 sets the waiting time to be shorter, under an assumption that the reading target has been completed and thus it is likely that the user wants the reading to be executed immediately, when the completion level determined by the determination unit 123 is high.

The generation unit 125 generates the read image data from the captured reading image acquired by the acquisition unit 121. In the present exemplary embodiment, the user sets a data saving format (image file, file document, and the like) in advance. The generation unit 125 generates the data according to the saving format and stores the data in a storage unit 126 as a functional unit of the storage device 114 or the RAM 113. The data thus stored can be transmitted to and used by another information processing apparatus (printing apparatus) connected to the information processing apparatus 100 through a wired or wireless network.

The display control unit 127 reads out the stored read image data or a UI object stored in advance from the storage unit 126 to generate and then output a display image to be projected by the display device 103.

In the present exemplary embodiment, the determination unit 123 evaluates the completion level of the reading target when the space on the reading plate 102 is in the motionless state. Thus, for determining a timing of capturing the read image, the determination unit 123 determines the completion level as a value in a range of 0 to 100, based on a ratio of the area of a vacant portion on the reading plate 102 and the position of the object. FIG. 2 illustrates a plurality of examples of the completion level of the reading target on the reading plate 102 according to the present exemplary embodiment. States 200 to 204 each represent a state of the reading plate 102 viewed from the position of the camera 104. The upper surface of the reading plate 102 has an A3 size.

First of all, in the state 200, no object is placed. In this state, no reading is executed due to the absence of the reading target.

In the state 201, a white sheet of paper is placed in the center of the reading plate 102. In this case, in the present exemplary embodiment, the determination unit 123 determines 0 as the completion level because the vacancy rate on the object is high, regarding that another object is likely to be laid on the sheet serving as the background. There might be a case where the user wants the reading to be executed even when the vacancy rate is high. Thus, in the present exemplary embodiment, the case of completion level 0 is distinguished from the case without the reading target as in the state 200. Thus, even when the completion level is 0, the reading is executed if the object on the reading plate 102 remains to be in the motionless state for the determined waiting time. Therefore, the information processing apparatus 100 does not have the problem of "blank or near blank document cannot be automatically read".

In the state 202, an A4 document with a text being written is placed in the center of the reading plate 102. In this case, the vacancy rate on the object is low, the object is in the center of the reading plate 102, and another object of the same size cannot be further disposed. Thus, in the present exemplary embodiment, it is regarded that this single document is likely to be the reading target, whereby the completion level is set to 100. In the present exemplary embodiment, the waiting time is also set for the completion level 100. Thus, when editing such as further laying another document is performed during the waiting time, the completion level is newly determined without meaningless reading being executed.

In the state 203, a 2L size photograph is disposed in an upper left corner of the reading plate 102. In the state 204, 2L size photographs are respectively disposed in three portions (three of four corners) of the reading plate 102. In the present exemplary embodiment, when an object, with a small area with respect to the reading plate 102, is placed to the side to leave a vacant portion on the reading plate 102, it is regarded that another object is likely to be further disposed. In the state 203, three more objects of the same size can be further disposed, and thus the completion level is 25. In the state 204, one more object of the same size can be further disposed, and thus the completion level is 75. In the present exemplary embodiment, a shorter waiting time is set for a higher completion level. Thus, a shorter waiting time is set for the state 204 than for the state 203. A longer waiting time is set for the state 204 with the completion level 75 than for the state 202 with the completion level 100.

Figure 3:
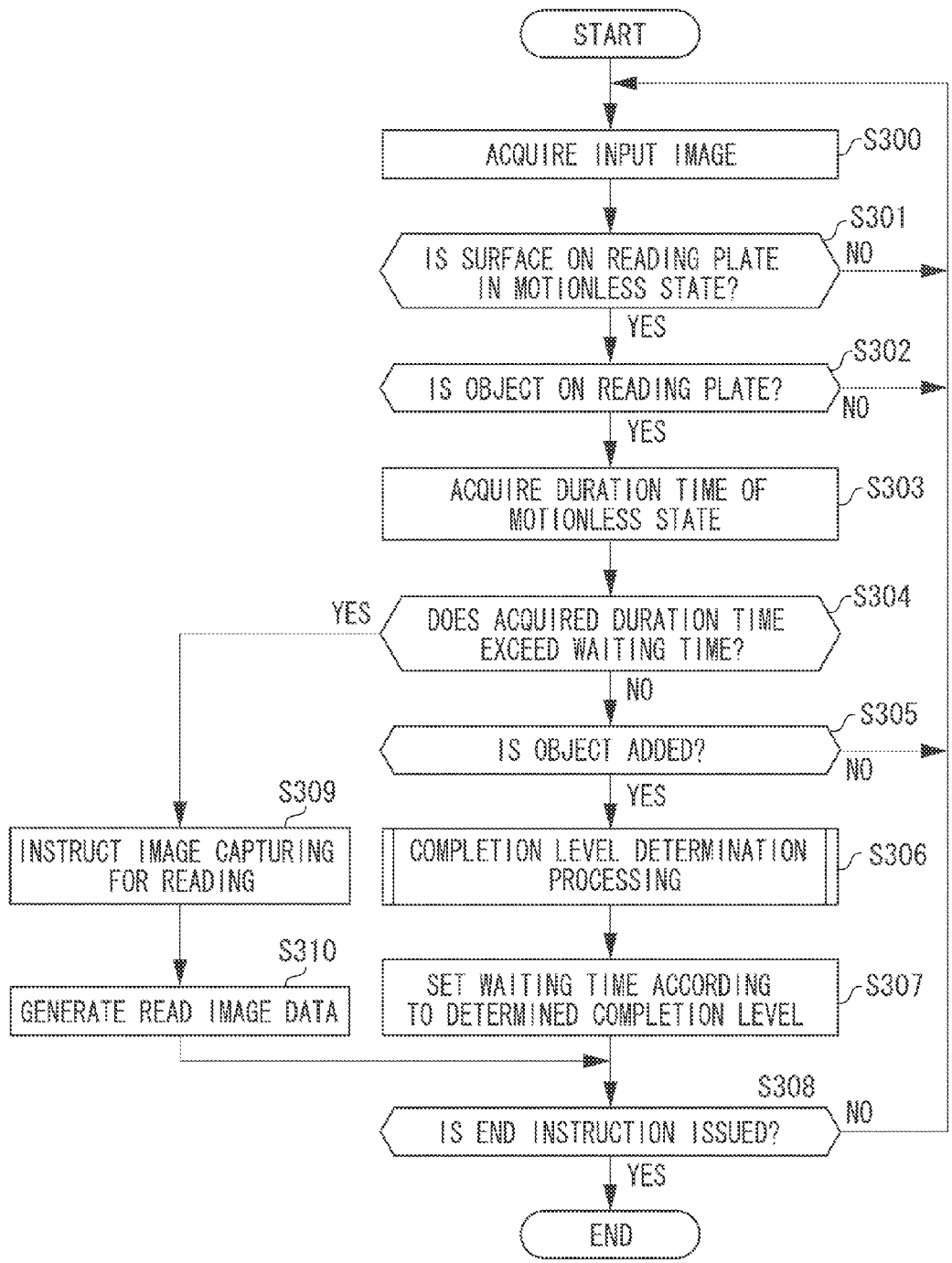
FIG. 3 is a flowchart illustrating an example of a flow of reading processing executed by the information processing apparatus.

Next, an example of a flow of the reading processing executed by the information processing apparatus 100 according to the present exemplary embodiment is described with reference to FIG. 3. In the present exemplary embodiment, in response to an instruction of starting a reading mode issued through a user operation in the information processing apparatus 100, a work area is initialized and a flowchart in FIG. 3 is started.

In step S300, the acquisition unit 121 acquires an input image. The input image corresponds to a single frame of a video captured by the camera 104. In the present exemplary embodiment, the operation in step S300 is repeated at a predetermined period, and every time the operation is performed, a still image corresponding to the latest single frame is acquired from the video captured by the camera 104. The predetermined period set as a repetition period is once in every 5 frames, 10 frames, or the like regarding a frame rate of the video captured by the camera 104.

In step S301, the reading control unit 122 determines whether the space on the reading plate 102 is in the motionless state based on the input image thus acquired. The reading control unit 122 automatically determines NO in step 301 in the first processing. In the present exemplary embodiment, the reading control unit 122 compares the most recently acquired input image with the second most recently acquired input image. When the difference thus obtained is smaller than a predetermined reference value, the reading control unit 122 determines that the space on the reading plate 102 is in the motionless state. When the difference is large, that is, when the reading control unit 122 determines that the space on the reading plate 102 is not in the motionless state (NO in step S301), the reading control unit 122 determines that there is a movement on the reading plate 102. Thus, the processing returns to step S300, to be repeated on a newly acquired input image. When the reading control unit 122 determines that the space on the reading plate 102 is in the motionless state (YES in step S301), the reading control unit 122 stores information indicating time, and the processing proceeds to step S302. The information indicating time is accumulated every time the operation in step S301 is performed, until the flowchart in FIG. 3 is terminated.

In step S302, the reading control unit 122 determines whether an object is on the reading plate 102. The reading control unit 122 according to the present exemplary embodiment compares the acquired input image with a reference image (obtained by capturing an image of the reading plate without any object placed on), and recognizes the resultant difference as the object. The portion recognized as the object is divided into at least one area not in contact with another area, and each area thus obtained is recognized as the object. When an object has already been recognized based on the previous input image, an object formed by laying another object on the object that has already been placed is recognized while being distinguished from the object that has already been placed. More specifically, one object is regarded as being laid on top of another, when the difference between the input images is found in the area that has already been recognized as the object. The reading control unit 122 stores information indicating the number of objects that are distinguished from each other, and the area deemed to include the object. The information is accumulated every time the operation in step S302 is performed until the flowchart in FIG. 3 is terminated. When the reading control unit 122 determines that there is an object (YES in step S302), the processing proceeds to step S303. When the reading control unit 122 determines that there is no object (NO in step S302), the processing returns to step S300, and the processing is repeated on a newly acquired input image.

In step S303, the reading control unit 122 acquires a time elapsed after the motionless state is achieved on the reading plate 102 (duration time of motionless state). In the present exemplary embodiment, the information indicating time is stored when the reading control unit 122 determines that the space on the reading plate 102 is in the motionless state in step S302. Thus, the reading control unit 122 acquires a period between the oldest time and the latest time as the duration time of the motionless state.

In step S304, the reading control unit 122 determines whether the acquired duration time exceeds the waiting time set by the setting unit 124 in step S307 described below. The reading control unit 122 automatically determines NO in the first processing. When the reading control unit 122 determines that the duration time exceeds the waiting time (YES in step S304), the processing proceeds to step S309. On the other hand, when the reading control unit 122 determines that the duration time does not exceed the waiting time (NO in step S304), the processing proceeds to step S305.

In step S305, the reading control unit 122 determines whether an object is additionally disposed on the reading plate 102. In the present exemplary embodiment, the reading control unit 122 determines whether the number of objects recognized from the latest input image exceeds the number of the objects recognized in the previous processing, based on the history of the information stored in step S302. The reading control unit 122 automatically determines YES in the first processing. When the reading control unit 122 determines that the object is additionally disposed (YES in step S305), the processing proceeds to step S306. When the reading control unit 122 determines that the object is not additionally disposed (NO in step S305), the processing returns to step S300 and the processing is repeated on a newly acquired input image. In step S306, the reading control unit 122 executes completion level determination processing for the reading target on the reading plate 102.

Figure 4:
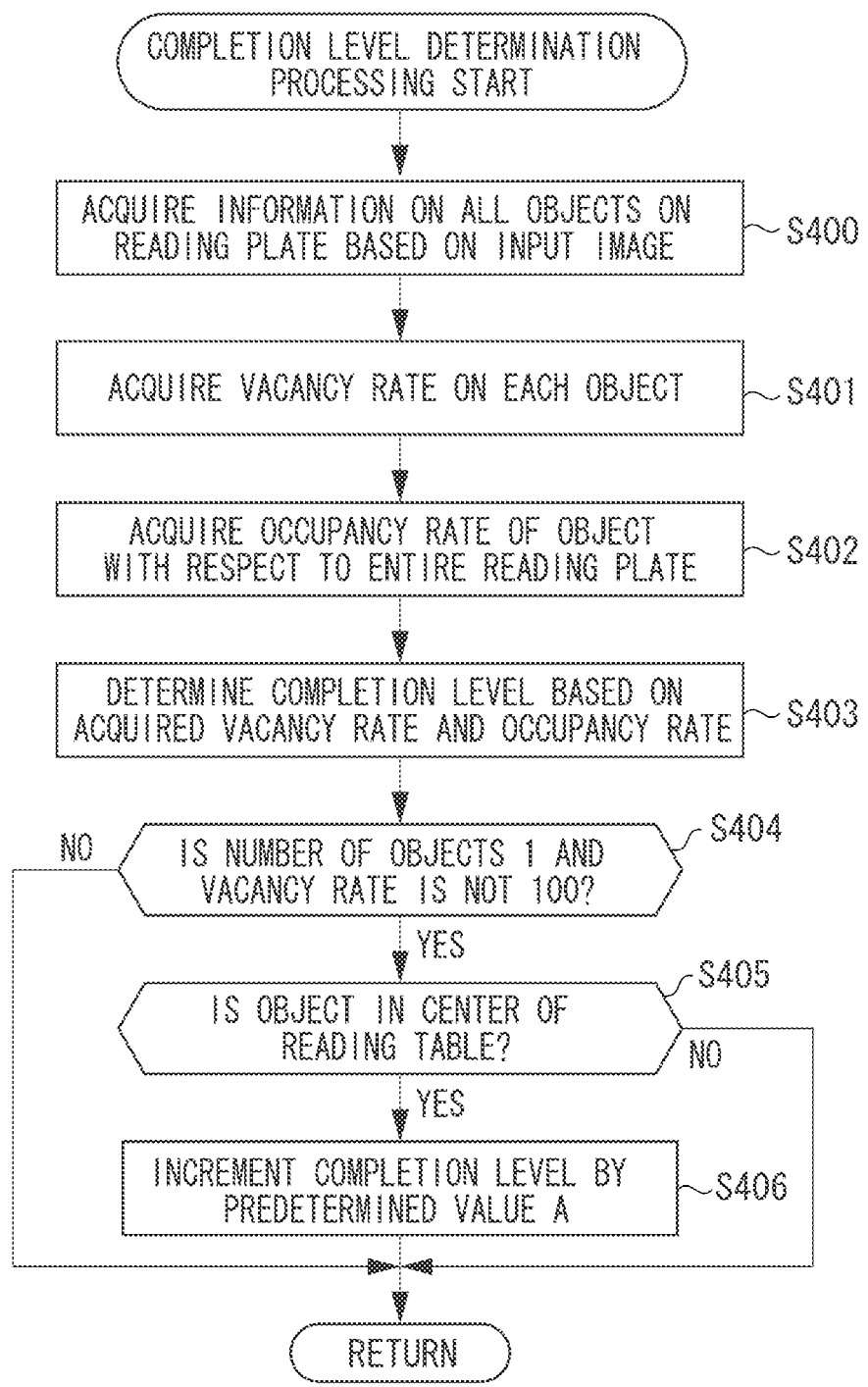
FIG. 4 is a flowchart illustrating an example of a flow of completion level determination processing executed by the information processing apparatus.

FIG. 4 is a flowchart illustrating a flow of the completion level determination processing according to the present exemplary embodiment, executed when the processing proceeds to step S306.

In step S400, the determination unit 123 recognizes the information on all the objects on the reading plate 102 based on the input image. The determination unit 123 according to the present exemplary embodiment analyzes a partial area in the area recognized as the object in step S302 to obtain the shape, the area, the size, the color distribution, and the like.

In step S401, the determination unit 123 acquires and stores a vacancy rate on each object, based on the information on color obtained as a result of the analysis. In the present exemplary embodiment, the dominant color in the area of each object is determined as a background color, and the vacancy rate is obtained as the percentage of an area having the background color, in the total area of each object. For example, when the object is a document as a white A4 copy sheet having text on about half of the white A4 copy sheet, the vacancy rate is 50 (the area of a margin is not taken into account for the sake of description).

In step S402, the determination unit 123 acquires and stores an occupancy rate as the rate of the area, of the portion occupied by the object forming the reading target, with respect to the entire area of the upper surface of the reading plate 102. In the present exemplary embodiment, the occupancy rate is determined by an image analysis based on an idea "how many more objects having the same area as the most recently placed object can be disposed in a vacant portion on the reading plate 102". The vacant portion on the reading plate 102 includes a portion of the reading plate 102 where no object is placed and a vacant portion on the object. For example, in the state 202 in FIG. 2, the A4 size copy sheet, occupying half the area of the reading plate 102 of A3 size, is placed in the center of the reading plate 102. Thus, the reading plate 102 has no area left for placing another object of the same A4 size. Therefore, the occupancy rate is 100. For example, in the state 203 illustrated in FIG. 2, the 2L size photograph is placed in the corner of the reading plate 102. In this case, the reading plate 102 has an area left for three more objects of the same 2L size. Thus, the occupancy rate is one fourth, that is, 25. In the present exemplary embodiment, as described above, even when the total area of the vacant portion on the reading plate 102 is large, it is regarded that there is no vacant portion if the object cannot actually be disposed or when small vacant portions are dispersedly arranged. Thus, obtaining a realistic completion level, when the occupancy rate is reflected in the completion level described below, can be facilitated. This is because the completion level of the reading target is regarded as being high when no vacant portion where an object can be placed is left on the reading plate. However, the rate of the total area of all the objects with respect to the area of the entire reading plate 102 may be used as the occupancy rate. When the occupancy rate is determined in this way, the realistic occupancy rate can be obtained by a relatively simple calculation. This method is suitably used in a case where a large amount of small objects such as a sticky note is used.

In step S403, the determination unit 123 determines the completion level of the reading target on the reading plate 102 at the current time point, based on the acquired vacancy and occupancy rates. The completion level determined in the present exemplary embodiment increases as the object is additionally placed on the reading plate 102, that is, the number of objects increases, so that the vacant portion for placing the object on the reading plate 102 is reduced. For example, the completion level can be determined as follows. To begin with, an object with the vacancy rate 100 and the occupancy rate 100 is not taken into account in the calculation for the completion level. This is because such an object is a blank object having substantially the same size as the upper surface of the reading plate 102, and thus is likely to be a mount for arranging other objects. Thus, the object can be regarded as having substantially no effect on increasing the completion level. Thus, the completion level is 0 in the state 201 in FIG. 2, where only the object with the vacancy rate 100 and the occupancy rate 100 is on the reading plate 102. For example, in the present exemplary embodiment, the completion level of the object other than the one describe above is calculated with a method represented by the following Formula 1.

completion level of reading target=average value of
(100−vacancy rate)×occupancy rate/100 (Formula 1)

Thus, when the A4 copy sheet having text on about half of the A4 copy sheet (vacancy rate 50) is placed in the left half of the reading plate 102 of the A3 size (occupancy rate 50), the completion level is determined to be 25. For example, when the three photographs printed in 2L size (vacancy rate 0) are placed as illustrated in the state 204 (occupancy rate 75), the completion level is determined to be 75.

Next, in step S404, the determination unit 123 determines whether the number of objects on the reading plate 102 is one and the vacancy rate is not 100. When the determination unit 123 determines that the number of object placed on the reading plate 102 is one and the vacancy rate is not 100 (YES in step S404), the processing proceeds to step S405. When the determination unit 123 determines that the number of objects placed on the reading plate 102 is more than one or that the vacancy rate is 100 (NO in step S404), the completion level determination processing is terminated, and the processing returns to the reading processing.

In step S405, the determination unit 123 determines whether the object is in the center of the reading plate 102. In the present exemplary embodiment, the determination unit 123 determines that an object is in the center of the reading plate 102 when a distance between a geometrical center of the object and the center of the reading plate 102 is smaller than a predetermined threshold. Thus, the object in the center is distinguished from an object that is positioned in a portion other than the center, and partly on the center of the reading plate 102. When the determination unit 123 determines that the object is not in the center of the reading plate 102 (NO in step S405), the completion level determination processing is terminated, and the processing returns to the reading processing. On the other hand, when the determination unit 123 determines that the object is in the center of the reading plate 102 (YES in step S405), the processing proceeds to step S406.

In step S406, the determination unit 123 increments the completion level determined in step S403 by a predetermined value A, and the processing returns to the reading processing. The flow of processing described above is based on the following idea in the present exemplary embodiment. Specifically, when a single object is placed in the center of the reading plate 102, even when the area of the object is small, the reading of the single object is likely to be a target intended by the user. For example, the predetermined value A is set to 10.

Referring back to the reading processing, in step S307, the setting unit 124 sets the waiting time according to the completion level determined in step S306. The setting unit 124 notifies the reading control unit 122 of the set waiting time, and thus the reading control unit 122 stores the waiting time. As described above, the waiting time thus set is used for the determination operation performed by the reading control unit 122 in step S304. In the present exemplary embodiment, the waiting time is set to 10 seconds when the completion level is 0, set to 8 seconds when the completion level is in a range of 1 to 25, set to 6 seconds when the completion level is in a range of 26 to 50, set to 4 seconds when the completion level is in a range of 51 to 75, and set to 2 seconds when the completion level is 76 or more. However, the waiting times described above are merely an example and should not be construed in a limiting sense. The waiting time can be set more in detail. The waiting time may also be obtained by using a function of the completion level. In all the methods described above, a waiting time (e.g., 2 seconds) in a case where the completion level is determined as a first value (100 for example) is set to be shorter than that (e.g., 6 seconds) in a case where the completion level is determined as a second value (e.g., 50) smaller than the first value.

In step S308, the CPU 111 determines whether the user has input an end instruction. In the present exemplary embodiment, the input of the end instruction is notified when the information processing apparatus 100 is turned OFF or when a state, where the information processing apparatus 100 is not operated, continues for more than a predetermined time. When the CPU 111 determines that the end instruction is not input (NO in step S308), the processing returns to step S300, and the processing is repeated on a newly acquired input image. When the CPU 111 determines that the end instruction is input (YES in step S308), the reading processing is terminated.

When the processing proceeds to step S309 from step S304, the reading control unit 122 instructs the camera 104 to capture the reading image. Thus, the acquisition unit 121 acquires the image thus captured. The camera 104 thus instructed sets the in-focus and zoom positions to each object recognized in step S302, and captures an image of the object with a high resolution setting. When there is more than one object, the image capturing described above is performed for the same number of times as the number of the objects. However, the read image may be obtained by a method of capturing an image of the entire reading plate 102 and extracting the portion of the object.

In step S310, the generation unit 125 generates the read image data based on the image acquired by the acquisition unit 121. In the present exemplary embodiment, the data in the saving format set in advance by the user is generated and stored in the storage unit 126. When the read image data is generated, the processing proceeds to step S308.

Figure 5:
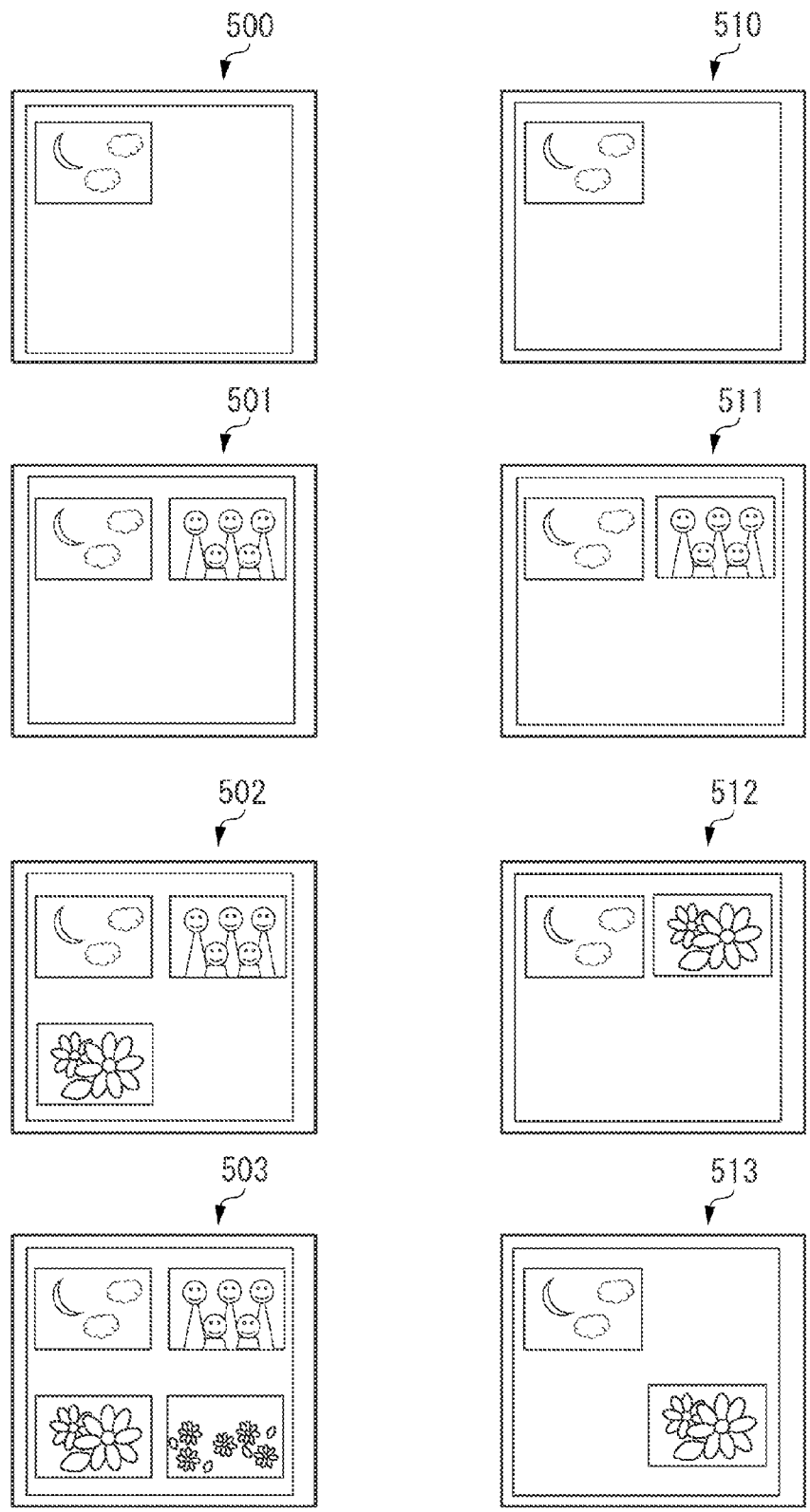
FIG. 5 is a diagram illustrating an example of how a plurality of objects is arranged on the reading plate.

The flow of the processing executed by the information processing apparatus 100 according to the present exemplary embodiment is as described above. Thus, when the completion level 100 is achieved by placing a single object as in the state 202 illustrated in FIG. 2, for example, the reading is executed after waiting for only seconds after the user takes the user's hand off the reading plate 102. On the other hand, when a single reading target includes a plurality of objects sequentially arranged on the reading plate 102, the waiting time is set to be long enough for the user to perform an operation of selecting and arranging the objects. An example of the setting thereof is described with reference to states 500 to 503 in FIG. 5. FIG. 5 illustrates an example of how a plurality of objects is arranged on the reading plate 102 having the upper surface of the A3 size.

In the state 500, a single 2L size photograph is placed on white vellum paper. In the present exemplary embodiment, in the state where the white vellum paper is placed, the vacancy and occupancy rates are both 100, and thus the completion level is 0. In the present exemplary embodiment, when the completion level is 0, the setting unit 124 sets 10 seconds as the waiting time before the reading. It is assumed that a single photograph is placed in an upper left portion of the vellum paper as illustrated in the state 500, within 10 seconds after the user has placed the vellum paper on the reading plate 102. The occupancy rate 25 is achieved by the photograph with the vacancy rate 0, thus the completion level of the reading target is 25, whereby the waiting time is set to 8 seconds. Then, it is assumed that the second photograph is arranged next to the first photograph as in the state 501, within 8 seconds after the object has been arranged as in the state 500. Thus, the occupancy rate 50 is achieved by the two photographs with the vacancy rate of 0. Thus, the completion level of the reading target is 50, whereby the waiting time is set to 6 seconds, which is shorter than that for the state 500. Therefore, when the state 501 is the state intended by the user to be read, the read image data can be obtained earlier than that in the case where only a single photograph is placed. However, in the state 501, the photographs are relatively concentrated in the upper half portion of the mount, implying that a photograph might be additionally disposed in the lower half portion. Thus, in the present exemplary embodiment, the waiting time is set to 6 seconds, which is long enough for the user to perform the operation of disposing a photograph in the lower half portion. Similarly, in the state 502 achieved by additionally placing one more photographs within 6 seconds after the object has been arranged as in the state 501, the completion level is determined to be 75 and the waiting time is set to 4 seconds. For the state 503 where the completion level reaches 100 with the photograph further placed, the waiting time is set to 2 seconds. As in the state 202 in FIG. 2, the read image is obtained as soon as 2 seconds pass after the hand, placing the object, is pulled out of the angle of view of the camera 104.

As described above, in the present exemplary embodiment, the completion level is determined that increases as a plurality of objects is sequentially placed to reduce the area of the vacant portion on the reading plate 102. A shorter waiting time before the reading is executed is set for a larger completion level. Thus, by evaluating the completion level of the reading target, the reading can be executed at an appropriate timing even when the reading target includes a plurality of objects.

The reading control unit 122 according to the present exemplary embodiment performs control of executing reading at the point of time when the duration time of the state where all the objects on the reading plate 102 is motionless exceeds the waiting time. The timing of executing reading is not limited to this. For example, a modification can be made so that the reading is executed as soon as the completion level exceeds a predetermined value. In the completion level determination processing for the reading target described above, the completion level is determined based on both the vacancy rate and the occupancy rate. Alternatively, the vacancy rate may be ignored, and the occupancy rate may be used as the completion level. Furthermore, a modification may be made so that an operation of recognizing whether the object placed on the reading plate 102 is a predetermined object is added, and the completion level is determined based on whether the predetermined object is placed at a predetermined position.

As described above, in the first exemplary embodiment, assuming that a single reading target includes a plurality of sequentially increased objects, the completion level is determined to be higher as the vacant portion remaining on the reading plate 102 is reduced by adding the object. In a second exemplary embodiment, an example where the completion level is increased according to editing on the reading target such as moving and removing the object placed on the reading plate 102 is described.

The hardware and the functional configurations of the information processing apparatus 100 according to the present exemplary embodiment are similar to those in the first exemplary embodiment and thus will not be described. The determination unit 123 according to the second exemplary embodiment determines the completion level according to any of the operations of "remove object", "change object", and "move object" in a case where no object is additionally disposed on the reading plate 102. The operations are expected to be performed by the user with an intension of increasing the completion level of the reading target on the reading plate 102 from that before the operation is performed. Thus, the determination unit 123 according to the present exemplary embodiment increases the completion level when recognizing that any of the operations is performed.

Figure 6:
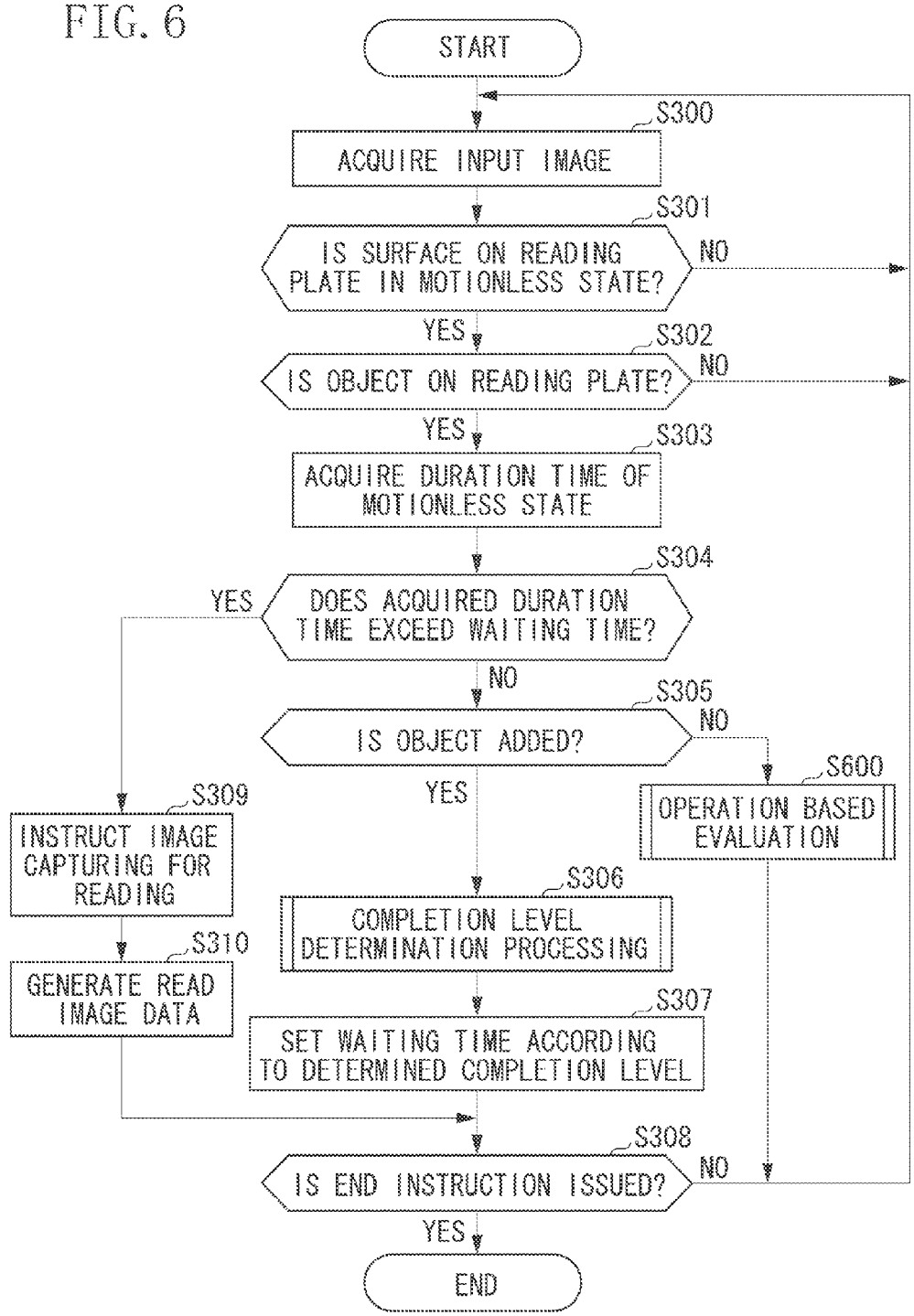
FIG. 6 is a flowchart illustrating an example of a flow of reading processing executed by the information processing apparatus.

FIG. 6 is a flowchart illustrating a flow of reading processing executed in the information processing apparatus 100 according to the present exemplary embodiment. In the present exemplary embodiment, in response to an instruction of starting a reading mode issued through a user operation in the image processing apparatus 100, a work area is initialized and a flowchart in FIG. 6 is started. The operations in FIG. 6 that are the same as those in the flowchart in FIG. 3 are denoted with the same reference numerals and will not be described in detail.

Figure 7:
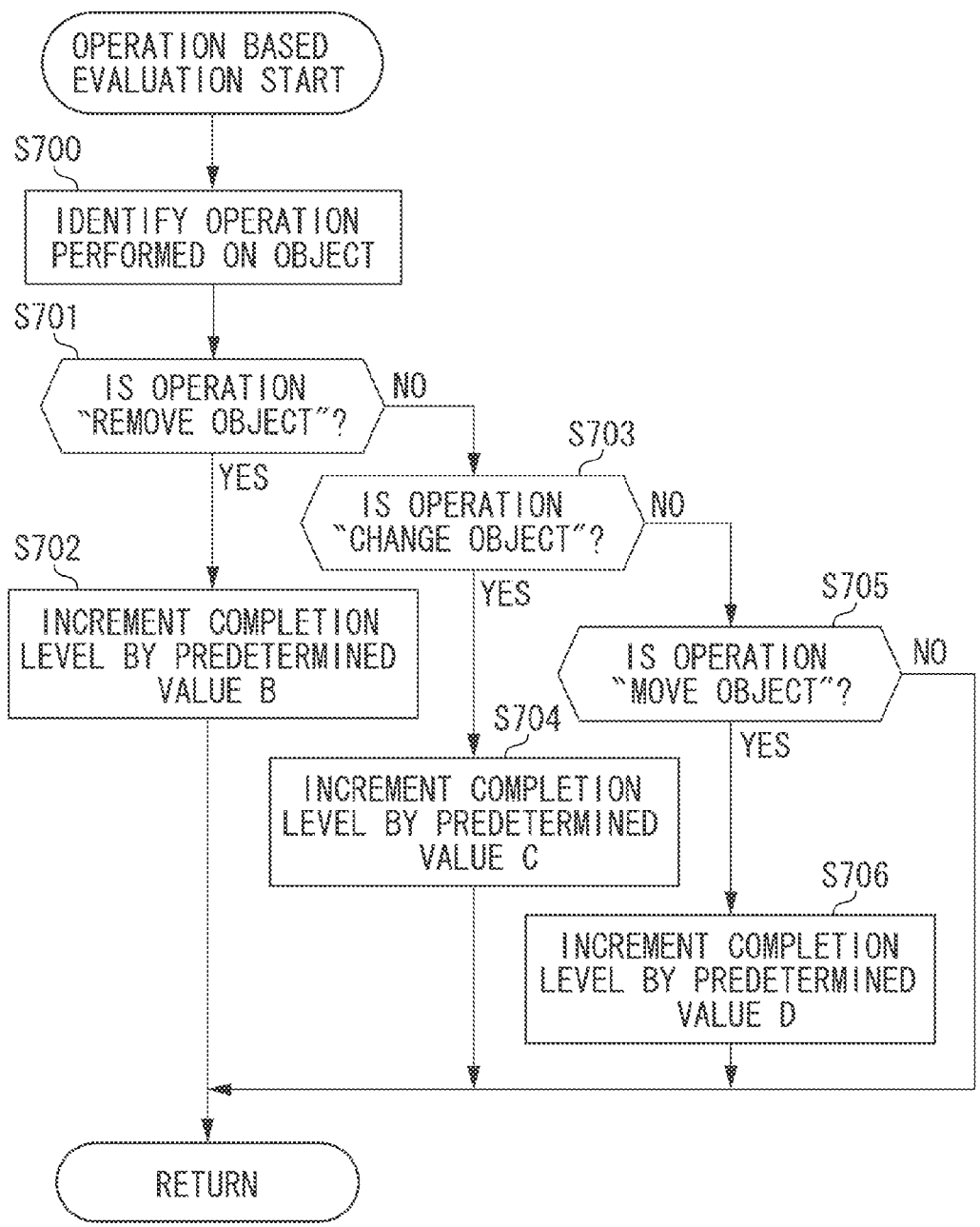
FIG. 7 is a flowchart illustrating an example of a flow of operation based evaluation processing executed by the information processing apparatus.

In the second exemplary embodiment, when the reading control unit 122 determines that the object is not added in step S305 (NO in step S305), the processing proceeds to operation based evaluation processing in step S600. The state where the object is on the reading plate 102 and the object is not added indicates that the number of the objects has been stored by the reading control unit 122 at least once and the number remains to be the same or is reduced. In other words, the state indicates that a certain operation might have been performed on the object that has already been placed on the reading plate 102. Thus, in the present exemplary embodiment, the operation performed on the object is identified to be reflected in the completion level. FIG. 7 is a flowchart illustrating the operation based evaluation performed in step S600 in detail.

In step S700, the determination unit 123 identifies the operation performed on the object. In the present exemplary embodiment, the reading control unit 122 accumulates the information on the number of objects and the information of the area, of the input image, where the object is disposed, in step S302. Thus, how the object has changed can be traced based on the history of the number and the area. The determination unit 123 identifies "remove object" as the performed operation, when the number of objects has been reduced, as a result of tracing the change of the object. The determination unit 123 identifies "change object" as the performed operation, when the content of the image in the area where the object is disposed has changed. The content of the image is determined to have changed, when change in a characteristic amount of the image, as a numerical value of a RGB value, a luminance, or the like, is found between the currently captured image and the previously captured image. The determination unit 123 identifies "move object" as the performed operation, when the position of the area where the object is disposed has moved.

In step S701, the determination unit 123 determines whether the operation identified in step S700 is "remove object". When the determination unit 123 determines that the operation is "remove object" (YES in step S701), the processing proceeds to step S702. When the determination unit 123 determines that the operation is not "remove object" (NO in step S701), the processing proceeds to step S703. In step S702, the determination unit 123 increments the most recently determined completion level by a predetermined value B, and determines the result as the completion level obtained as a result of performing the operation "remove object". In the present exemplary embodiment, the predetermined value B is 5, for example. The determination unit 123 notifies the setting unit 124 of the determined completion level, and the processing returns to the flowchart in FIG. 6.

In step S703, the determination unit 123 determines whether the operation identified in step S700 is "change object". When the determination unit 123 determines that the operation is "change object" (YES in step S703), the processing proceeds to step S704. When the determination unit 123 determines that the operation is not "change object" (NO in step S703), the processing proceeds to step S705. In step S704, the determination unit 123 increments the most recently determined completion level by a predetermined value C, and determines the result as the completion level obtained as a result of performing the operation "change object". In the present exemplary embodiment, the predetermined value C is 10, for example. The predetermined value C is set to be larger than the predetermined value B because the case where the object is removed is more likely to involve a subsequent operation such as adding a new object, compared with the case where the object is changed. In the present exemplary embodiment, the change in the area between the objects before and after the change is not taken into account. Alternatively, a more advanced configuration, such as incrementing the completion level with a larger value when the area increases, may be employed. The determination unit 123 notifies the setting unit 124 of the determined completion level, and the processing returns to the flowchart in FIG. 6.

In step S705, the determination unit 123 determines whether the operation identified in step S700 is the operation "move object". When the determination unit 123 determines that the operation is the operation "move object" (YES in step S705), the processing proceeds to step S706. When the determination unit 123 determines that the operation is not the operation "move object" (NO in step S705), it is regarded that no operation has been performed. Thus, the processing of the information processing apparatus 100 returns to the reading processing. In step S706, the determination unit 123 increments the most recently determined completion level by a predetermined value D, and determines the result as the completion level obtained as a result of performing the operation "move object". In the present exemplary embodiment, the predetermined value D is 5 for example. In the present exemplary embodiment, the movement distance of the object is not taken into account. Alternatively, a more advanced configuration, such as changing the value added to the completion level according to the movement distance, may be employed. The determination unit 123 notifies the setting unit 124 of the determined completion level, and the processing returns to the flowchart in FIG. 6.

Referring back to the flowchart in FIG. 6, the operations thereafter are performed as in the flowchart in FIG. 3 according to the first exemplary embodiment. The waiting time before the reading is executed is set to be shorter as the determined completion level increases. In the present exemplary embodiment, for example, the setting unit 124 sets the waiting time as follows. Specifically, the waiting time is set to 10 seconds when the completion level is 0, set to 9 seconds when the completion level is in a range of 1 to 10, set to 8 seconds when the completion level is in a range of 11 to 20, set to 7 seconds when the completion level is in a range of 21 to 30, set to 7 seconds when the completion level is in a range of 31 to 40, set to 6 seconds when the completion level is in a range of 41 to 50, set to 5 seconds when the completion level is in a range of 51 to 60, set to 4 seconds when the completion level is in a range of 61 to 70, set to 3 seconds when the completion level is in a range of 71 to 80, set to 2 seconds when the completion level is in a range of 81 to 90, and set to 1 second when the completion level is 91 or larger.

An example of the waiting time set in the second exemplary embodiment is described with reference to the states 510 to 513 in FIG. 5. The completion levels are determined to be 25 and 50 respectively for the states 510 and 511 as described in the first exemplary embodiment. In the present exemplary embodiment, the waiting time is set to 7 seconds for the state 510 and 6 seconds for the state 511. The state 512 illustrates a state where the right one of the two photographs arranged side by side in the state 511 is changed to a different photograph. In the second exemplary embodiment, the completion level is incremented by 10 when the operation "change object" is performed. Thus, the completion level of the state 512 is 60, and the waiting time is changed to 5 seconds. In the state 513, the right photograph is moved and thus, the layout on the reading plate is changed to that where two photographs are diagonally arranged. In the present exemplary embodiment, the completion level is incremented by 5 when the operation "move object" is performed. Thus, the completion level of the state 513 is 65, and the waiting time is set to 4 seconds.

As described above, in the second exemplary embodiment, the reading target is evaluated to have been edited to increase the completion level even when no object is newly added, if the user intentionally performs an operation on the object. Thus, the user can quickly obtain the read image. Also in the present exemplary embodiment, the vacancy rate may be ignored, and the occupancy rate may be used as the completion level.

As described above, in the first and the second exemplary embodiments, the waiting time set according to the completion level is a predetermined time determined in advance. In a third exemplary embodiment, an example is described where a reference waiting time is set for each user according to a time interval (operation interval) for repeating the operation performed by the user to place an object on the reading plate. Then, the waiting time is changed from the reference waiting time according to the completion level of the reading target, and the resultant time is set as the waiting time.

The hardware and the functional configurations of the information processing apparatus 100 according to the present exemplary embodiment are the same similar to the first exemplary embodiment, and thus will not be described. In the third exemplary embodiment, the setting unit 124 acquires an operation interval. The operation interval is a period of time between when the user places a single object on the reading plate 102 and when the user places the next object. More specifically, the operation interval is the duration time of the motionless state on the reading plate 102 after the single object is placed. The setting unit 124 sets the reference waiting time based on the operation interval. Then, the setting unit 124 changes the waiting time from the reference waiting time according to the completion level determined by the determination unit 123 and sets the resultant time as the waiting time.

Figure 8:
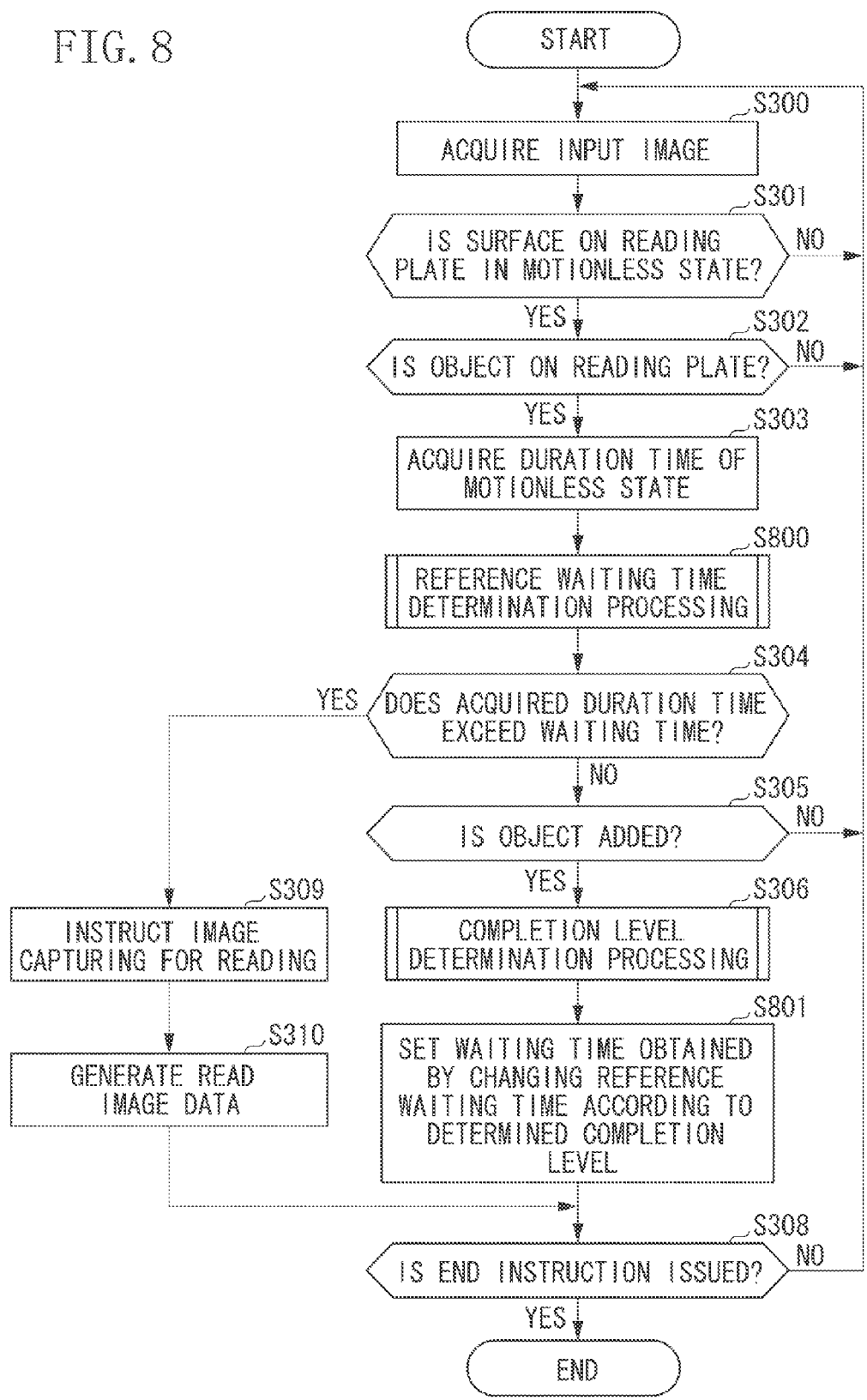
FIG. 8 is a flowchart illustrating an example of a flow of reading processing executed by the information processing apparatus.

FIG. 8 is a flowchart illustrating a flow of reading processing executed by the information processing apparatus 100 according to the present exemplary embodiment. In the present exemplary embodiment, in response to an instruction of starting a reading mode issued through a user operation in the image processing apparatus 100, a work area is initialized and a flowchart in FIG. 8 is started. The operations in FIG. 8 that are the same as those in the flowchart in FIG. 3 are denoted with the same reference numerals, and will not be described in detail.

Figure 9:
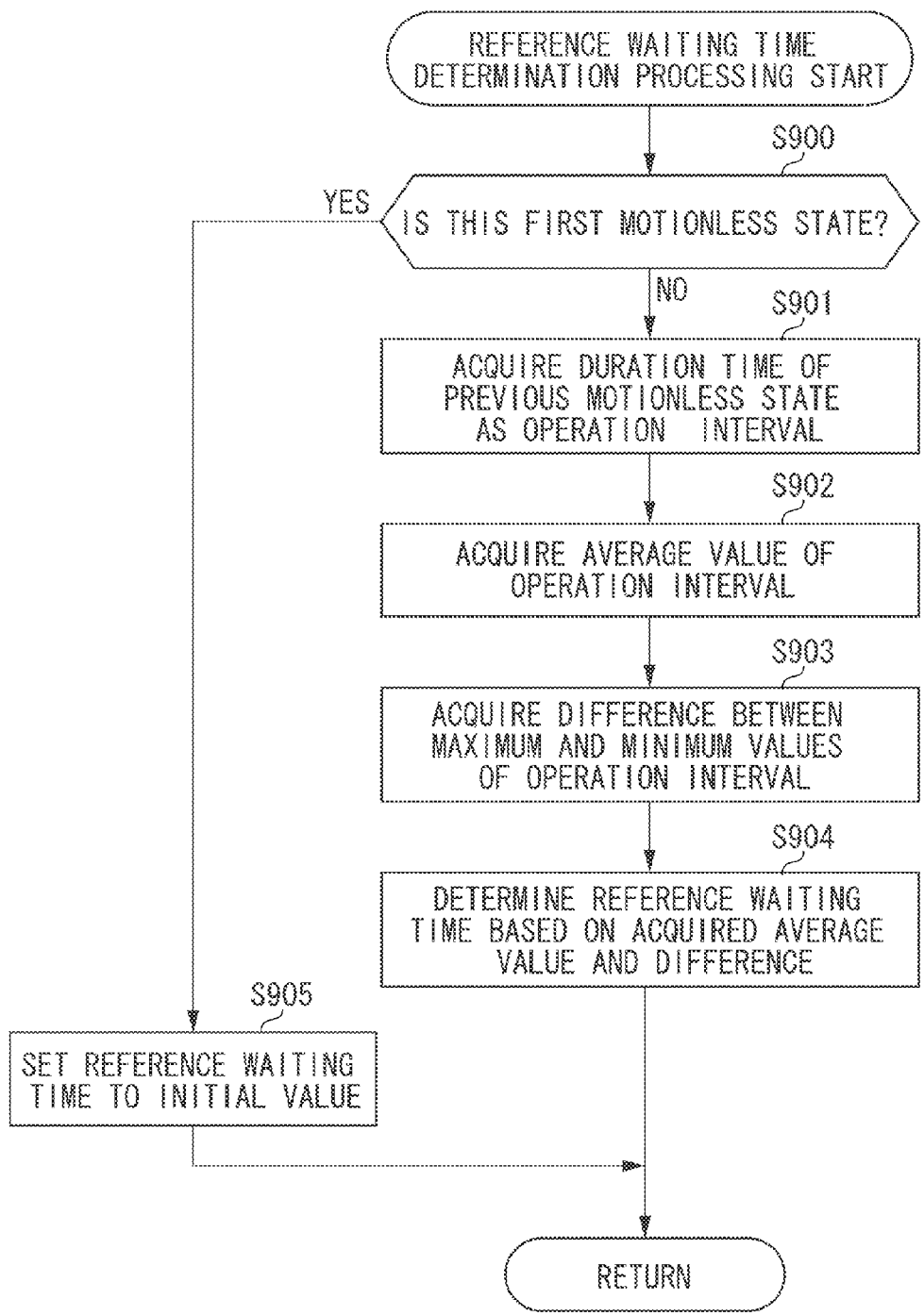
FIG. 9 is a flowchart illustrating an example of a flow of reference waiting time determination processing executed by the information processing apparatus.

In the third exemplary embodiment, the processing proceeds to reference waiting time determination processing in step S800 after the reading control unit 122 acquires the duration time of the motionless state in step S303. FIG. 9 is a flowchart illustrating the operation based evaluation method executed in step S800 in detail.

In step S900, the setting unit 124 determines whether the object on the reading plate 102 is in the motionless state for the first time since the processing of the flowchart in FIG. 8 has started. In the present exemplary embodiment, this determination is made based on the information indicating the time when the object is determined to be in the motionless state, stored in step S301. When the setting unit 124 determines that this is not the first motionless state (NO in step S900), the processing proceeds to step S901. On the other hand, when the setting unit 124 determines that this is the first motionless state (YES in step S900), the processing proceeds to step S905. In step S905, the reference waiting time is set to an initial value set in advance. Then, the processing returns to the reading processing in FIG. 8. In the present exemplary embodiment, the initial value is 6 seconds, for example.

In step S901, the setting unit 124 acquires the duration time of the previous motionless state as the operation interval between the two previous operations. Then, the setting unit 124 stores the acquired operation interval. In the present exemplary embodiment, the duration time of the previous motionless state is calculated based on the information on time accumulated in step S301, to be stored as the operation interval between two previous operations. The information on the operation interval is accumulated every time the operation in step S901 is performed until the flowchart in FIG. 8 is terminated. The operation in step S901 is omitted when the operation interval between two previous operations (duration time of the previous motionless state) is acquired before the current motionless state is over.

In step S902, the setting unit 124 acquires an average value of the operation intervals based on the information on the operation interval stored in step S901.

In step S903, the setting unit 124 acquires the difference between the maximum and minimum values of the accumulated operation intervals, based on the information on the operation interval stored in step S901. The difference is 0 when the information on the operation interval is stored only for a single operation interval.

In step S904, the setting unit 124 determines the reference waiting time based on the average value acquired in step S902 and the difference acquired in step S903, by the following Formula 2 in the present exemplary embodiment, for example:

reference waiting time=(average value+difference)× 1.5 (Formula 2).

When the reference waiting time is determined, the processing of the flowchart in FIG. 9 is terminated, and the processing returns to the reading processing in FIG. 8, and proceeds to the processing in step S304. The processing in steps S304 to S306 is performed in the same manner as in the flowchart in FIG. 3, and thus will not be described. Next, in the third exemplary embodiment, the processing proceeds to step S801 when the completion level of the reading target is determined in step S306.

In step S801, the setting unit 124 changes the reference waiting time determined in step S800 according to the completion level determined in step S306, and sets the resultant time as the waiting time. For example, in the present exemplary embodiment, when the completion level is 0, the reference waiting time is ignored and the waiting time is set to 10 seconds. The reference waiting time determined in step S800 is set as the waiting time when the completion level is in the range of 1 to 50. When the completion level is 51 or higher, a time obtained by multiplying the reference waiting time determined in step S800 by 0.8 is calculated as the waiting time. At that time, an integer value (seconds) obtained by rounding the number after the decimal point, which is 1 at the smallest, is set as the waiting time to be used in the operation performed by the reading control unit 122 in step S304.

Figure 10:
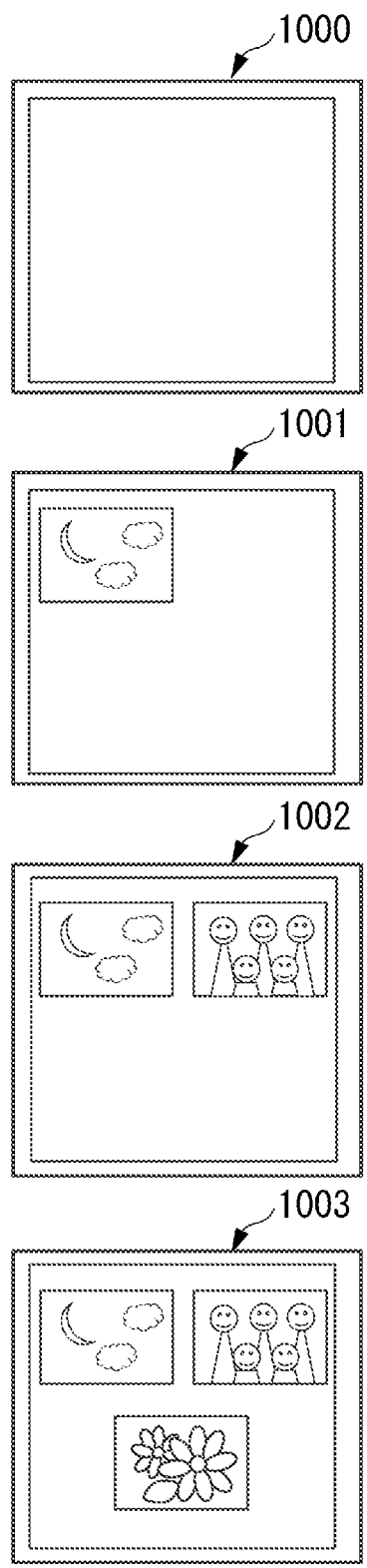
FIG. 10 is a diagram illustrating an example of how a plurality of objects is arranged on the reading plate.

An example of the reference waiting time set in the third exemplary embodiment and the actual waiting time before the reading is executed are described with reference to FIGS. 10 and 11. States 1000 to 1003 illustrate how a plurality of objects is sequentially arranged on the reading plate 102 by the user. FIG. 11 is example tables illustrating associations among an operation interval of each user, determined reference waiting times, and set waiting times.

A table 1100 illustrates a case of a user who quickly selects the next object to be placed, that is, who keeps the space on the reading plate 102 motionless for a short period of time. The operation intervals (duration times of the motionless state in the states 1000 to 1002) for sequentially placing the first, second, and third photographs after a state 1000 where a vellum paper is placed on the reading plate 102 are assumed to be 1 second, 2 seconds, and 1 second, respectively. As illustrated in the table 1100, at the point of the state 1000, the reference waiting time is set to the initial value, which is 6 seconds, and the completion level is 0. Thus, the waiting time before the reading is executed is set to 10 seconds. At the point of the state 1001, the average value of the operation interval is 1 second and the difference between the maximum and the minimum values is 0 because the duration of the previous motionless state is 1 second. Thus, the reference waiting time is 1.5 seconds. The completion level is 25 and thus the waiting time before the reading is executed is set to 2 seconds, by rounding the result of calculation on the reference waiting time after the decimal point. Next, at the point of the state 1002, the average value of the operation interval is 1.5 seconds and the difference between the maximum and the minimum values is 1 because the duration time of the previous motionless state is 2 seconds. Thus, the reference waiting time is 3.75 seconds. The completion level is 50 at that time and thus the waiting time before the reading is executed is set to 4 seconds, by rounding the result of calculation on the reference waiting time after the decimal point. Similarly, at the point of the state 1003, the reference waiting time is 3.5 seconds. The completion level is 100 and thus the waiting time before the reading is executed is set to 3 seconds, by multiplying the reference waiting time by 0.8 and rounding the resultant value after the decimal point. Therefore, the reading is executed when the duration time of the motionless state in the state 1003 exceeds 3 seconds.

A table 1101 illustrates a case of a user who takes long time to select the next object to be placed, that is, who keeps the space on the reading plate 102 motionless for a long period of time. The operation intervals for sequentially placing the first, second, and third photographs after the state 1000 where the vellum paper is placed on the reading plate 102 are assumed to be 10 seconds, 11 seconds, and 11 seconds, respectively. As illustrated in the table 1101, at the point of the state 1000, the reference waiting time is set to the initial value, which is 6 seconds, and the completion level is 0. Thus, the waiting time before the reading is executed is set to 10 seconds. At the point of the state 1001, the reference waiting time is 15 seconds because the duration time of the previous motionless state is 10 seconds flat, and the completion level is 25. Thus, the waiting time before the reading is executed is set to the reference waiting time, which is 15 seconds. Next, at the point of the state 1002, the reference waiting time is 17.25 seconds because the duration time of the previous motionless state is 11 second. The completion level is 50 and thus the waiting time before the reading is executed is set to 17 seconds, by rounding the result of calculation on the reference waiting time after the decimal point. Similarly, at the point of the state 1003, the reference waiting time is 17.5 seconds. The completion level is 100 and thus the waiting time before the reading is executed is set to 14 seconds, by multiplying the reference waiting time by 0.8 and rounding the resultant value after the decimal point. Therefore, the reading is executed when the duration time of the motionless state in the state 1003 exceeds 14 seconds.

As described above, the shorter waiting time is set for the user who sequentially places the objects in a short period of time. Thus, the reading can be performed at appropriate timings without making the user wait for a long time more than necessary. On the other hand, for the user who takes a long time to select the object to be placed next, a sufficiently long waiting time is set. Thus, unnecessary read image data can be prevented from being generated by the reading executed before the operation is completed.

As described above, in the third exemplary embodiment, the waiting time is set to be shorter as the completion level of the reading target on the reading plate increases, and the waiting time can be appropriately set for each user. Thus, the operability for reading a completed original including a plurality originals can be further improved. The method for determining the reference waiting time is not limited to the one described above. For example, the reference waiting time suitable for each user can be determined by such a method of setting a time obtained by adding a predetermined number of seconds (3 seconds for example) to the average value of the operation intervals, as the reference waiting time.

With the embodiments described above, the operability for reading a reading target including a plurality of objects can be improved.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-210430, filed Oct. 7, 2013, which is hereby incorporated by reference herein in its entirety.

What is claimed is:

1. An information processing apparatus configured to execute reading of a reading target placed on a reading plate on which a plurality of object can be placed, the information processing apparatus comprising:
  at least one processor; and
  a memory that is coupled with the at least one processor and that stores instructions executable by the at least one processor;
  wherein the at least one processor executes the instructions to implement:
  a detection unit configured to detect two or more objects placed on the reading plate;
  a setting unit configured to set, from among a plurality of predetermined waiting times that are gradually different in length, a waiting time according to at least a relationship that a length of the waiting time to be set decreases as a total number of objects among a layout of the two or more objects, detected by the detection unit, on the reading plate increases; and
  a reading control unit configured to instruct an imaging unit to perform image capturing to generate reading data in which the two or more objects are the reading target, when the layout of the two or more objects detected by the detection unit is maintained for the waiting time set by the setting unit.

2. An information processing apparatus configured to execute reading of a reading target placed on a reading plate on which a plurality of objects can be placed, the information processing apparatus comprising:
  at least one processor; and
  a memory that is coupled with the at least one processor and that stores instructions executable by the at least one processor;
  wherein the at least one processor executes the instructions to implement:
  a detection unit configured to detect one or more objects placed on the reading plate;
  a setting unit configured to set a waiting time according to at least a layout of the one or more objects, detected by the detection unit, on the reading plate;
  a reading control unit configured to cause an imaging unit to perform image capturing to generate reading data in which the one or more objects are the reading target, when the layout of the one or more objects detected by the detection unit is maintained for the waiting time set by the setting unit; and a determination unit configured to determine a completion level of the one or more objects as the reading target, based on at least the layout of the one or more objects detected by the detection unit, and wherein the setting unit is configured to set the waiting time according to the completion level determined by the determination unit.

3. The information processing apparatus according to claim 2, wherein when the layout of the one or more objects detected by the detection unit, on the reading plate changes within the waiting time set by the setting unit, the setting unit is further configured to set a waiting time determined according to the changed layout.

4. The information processing apparatus according to claim 2, wherein the setting unit is configured to set the waiting time to be shorter in a case where the completion level of the reading target is determined to be a first value, than the waiting time in a case where the completion level is determined to be a second value smaller than the first value.

5. The information processing apparatus according to claim 2, wherein the determination unit is configured to determine the completion level at least based on an occupancy rate as a rate of an area occupied by the one or more objects with respect to an area of an upper surface of the reading plate.

6. The information processing apparatus according to claim 5, wherein the occupancy rate is acquired based on a number of objects having a same size as one of the one or more objects most recently placed on the reading plate, which can be disposed in a vacant portion on the reading plate.

7. The information processing apparatus according to claim 2, wherein the determination unit is configured to determine a completion level that increases as an object is further disposed on the reading plate to reduce a vacant portion on which an object forming the reading target on the reading plate can be placed.

8. The information processing apparatus according to claim 2, wherein the determination unit is configured to further identify an operation performed on the object placed on the reading plate, and change the determined completion level by a value corresponding to the identified operation.

9. The information processing apparatus according to claim 2, wherein the determination unit is configured to change the completion level to be higher, when the object placed on the reading plate is moved.

10. The information processing apparatus according to claim 2, wherein the determination unit is configured to change the completion level to be higher, when the object placed on the reading plate is removed.

11. The information processing apparatus according to claim 2, wherein the determination unit is configured to change the completion level to be higher, when the object placed on the reading plate is changed.

12. The information processing apparatus according to claim 2, wherein the determination unit is configured to determine a reference of the waiting time before the reading of the reading target is executed, based on a time interval of an operation of sequentially placing the one or more objects on the reading plate.

13. The information processing apparatus according to claim 12, wherein the determination unit is configured to acquire the time interval of the operation of sequentially placing the one or more objects on the reading plate, based on a duration time of a motionless state on the reading plate until the object is last placed on the reading plate.

14. The information processing apparatus according to claim 2, wherein the reading control unit is configured to cause the imaging unit to perform the image capturing to generate the reading data in which the one or more objects are the reading target, when the object placed on the reading plate remains motionless for the waiting time set by the setting unit.

15. The information processing apparatus according to claim 2, wherein the reading control unit is configured to execute the reading at a timing at which an execution instruction specifically input by a user is received, even when the timing is within the waiting time set by the setting unit.

16. The information processing apparatus according to claim 2, wherein the determination unit is configured to determine the completion level of the one or more objects as the reading target, based on both of the layout of the one or more objects detected by the detection unit and the vacancy rate on the one or more objects.

17. A computer-readable non-transitory storage medium storing a program read and executed by a computer to cause the computer to function as an information processing apparatus configured to execute reading of a reading target placed on a reading plate on which a plurality of objects can be placed, the information processing apparatus comprising:

a detection unit configured to detect one or more objects placed on the reading plate;

a setting unit configured to set a waiting time according to at least a layout of the one or more objects, detected by the detection unit, on the reading plate; and a reading control unit configured to cause an imaging unit to perform image capturing to generate reading data in which the one or more objects are the reading target, when the layout of the one or more objects detected by the detection unit is maintained for the waiting time set by the setting unit; and a determination unit configured to determine a completion level of the one or more objects as the reading target, based on at least the layout of the one or more objects detected by the detection unit, and wherein the setting unit is configured to set the waiting time according to the completion level determined by the determination unit.

18. A method for controlling an information processing apparatus configured to read a reading target placed on a reading plate on which a plurality of objects can be placed, the method comprising:

detecting two or more objects placed on the reading plate;

setting, from among a plurality of predetermined waiting times that are gradually different in length, a waiting time according to at least a relationship that a length of the waiting time to be set decreases as a total number of objects among a layout of the two or more objects, detected by the detecting, on the reading plate increases; and instructing an imaging unit to perform image capturing to generate reading data in which the two or more objects are the reading target, when the layout of the two or more objects detected by the detecting is maintained for the waiting time set by the setting.

19. A computer-readable non-transitory storage medium storing a program read and executed by a computer to cause the computer to function as an information processing apparatus configured to execute reading of a reading target placed on a reading plate on which a plurality of objects can be placed, the information processing apparatus comprising:

a detection unit configured to detect two or more objects placed on the reading plate;

a setting unit configured to set, from among a plurality of predetermined waiting times that are gradually different in length, a waiting time according to at least a relationship that a length of a waiting time to be set decreases as a total number of objects among a layout of the two or more objects, detected by the detection unit, on the reading plate increases; and
a reading control unit configured to instruct an imaging unit to perform image capturing to generate reading data in which the two or more objects are the reading target, when the layout of the two or more objects detected by the detection unit is maintained for the waiting time set by the setting unit.

* * * * *